Patented Dec. 22, 1942

2,306,095

UNITED STATES PATENT OFFICE 2,306,095

WETTING AND PENETRATING COMPOUNDS AND METHOD OF PRODUCING THE SAME

Swanee Victor Valjavec, Greensboro, N. C., assignor to Morton Chemical Company, Greensboro, N. C., a corporation of North Carolina No Drawing. Application May 11, 1939,
Serial No. 273,129

8 Claims. (Cl. 260—471)

This invention relates to wetting agents and penetrants, for use in the textile and other industries, and to methods of preparing the same.

An object of the invention is to produce soluble compounds useful in neutral, acid and alkaline baths as wetting agents and penetrants.

A further object is to produce wetting and penetrating compounds which are relatively foamless when used in aqueous solution.

More particularly, the invention relates to and has for its object the production of a half ester of a polycarboxylic acid and an alcohol, the half ester having the general formula

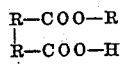

in which

is the acyl group of a polycarboxylic acid and in which R represents an alkyl radical and then amidating the remaining carboxylic group with an alkylol amine, giving a compound of the following general formula:

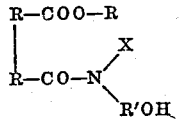

in which R'OH represents an alkylol group of an amine and X may represent either of hydrogen atom or another alkylol group.

I have found that if one mole of a poly-carboxylic acid is esterified with one mole of an alcohol, to produce a half ester and, if the remaining carboxylic group of the acid is condensed with one mole of an alkylol amine, a product results which is water soluble and useful as a wetting and penetrating agent in neutral, acid and alkaline solutions.

If the esterification is carried out at temperatures of from 100° C. to 140° C. for a period of from one to three hours, the best yield of the half ester is obtained. The process will proceed at a lower temperature, but a considerably longer time is required and higher temperatures will tend to darken the final product, although its efficiency will not be materially impaired.

The amidation of the remaining carboxylic group is preferably carried out at temperatures of from 140° C. to 180° C. for a period of several hours, although lower temperatures for a longer period of time or higher temperatures for shorter periods are satisfactory. The esterification and amidation are preferably carried out in neutral solutions, but this is not essential and, if desired, catalysts may be used.

While various poly-carboxylic acids, such as maleic, succinic, adipic, tartaric, citric, sebacic and phthalic acids, may be used, I prefer to use poly-carboxylic acid anhydrides, such as succinic, fumaric, maleic, or phthalic acid anhydrides, those having from four to eight carbon atoms being the most suitable.

The alkylol amine may be, and the term is intended to include, monoethanolamine, diethanolamine, triethanolamine, various butanol amines, isopropanol amines and higher alkylol diamines, such as ethyl hydroxy ethylene diamine.

The alcohols which I employ for forming the half ester of the poly-carboxylic acid preferably contain from four to twelve carbon atoms. They are usually primary alcohols such as butyl, hexyl, 2-ethylhexyl, amyl, or lauryl, although secondary alcohols may be used if desired.

The mechanism of the reactions is thought to be represented by the following equations:

(1) 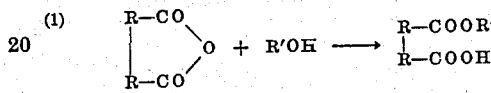

(2) 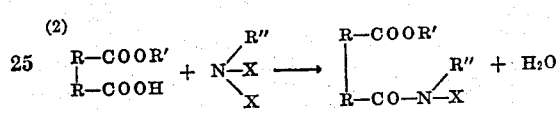

in which

is the acyl group of a dicarboxylic acid, R' represents the alkyl group of an alcohol, R'' represents the alkylol group of an amine and X represents either a hydrogen atom or another alkylol group of the amine.

The desired end product, as represented above, may be appropriately termed an alkyl alkylol amide of a poly-carboxylic acid or an alkylol amidated half ester of a poly-carboxylic acid.

The preferred procedure in obtaining the desired product is to first make the half ester, using a poly-carboxylic acid anhydride and alcohol and then amidate the half ester with an alkylol amine.

As illustrative of this procedure, the following examples are described:

Example I

One mole of maleic anhydride was mixed with one mole of 2-ethylhexyl alcohol and the mixture was heated for approximately two hours at a temperature range of 100° C. to 120° C. The half ester, which was thus formed, was cooled somewhat and one mole of diethanolamine was added. The mixture was then heated at a temperature range of 140° C. to 170° C. for a period of several hours. The resulting water soluble alkyl alkylolamide was viscous and oily in character and had very desirable wetting and penetrating properties.

Example II

One mole of phthalic anhydride was heated at temperatures of 100° C. to 120° C. with one mole of butanol, as in Example I, for approximately two hours to form the half ester of phthalic acid. The product was then amidated with one mole of diethanolamine by heating at temperatures of 140° C. to 180° C. for several hours. The resulting product was water soluble and had extremely good wetting qualities.

Example III

One mole of succinic anhydride was heated at temperatures of 100° C. to 120° C. for about two hours, as in Example I. The resulting half ester was amidated with one mole of triethanolamine by heating at temperatures of 140° C. to 180° C. for several hours. The resulting water soluble product had good wetting properties and its penetrating properties were at least equal to, and probably superior to, the penetrating properties of the products described in Examples I and II.

The foregoing examples are, of course, merely illustrative of the preferred method of practicing the invention and are not to be regarded as limiting in any sense. For example, the temperatures may be raised somewhat and the reaction time thereby shortened or a lower temperature may be used if the reaction time is lengthened. However, the best results are obtained if temperatures of the order of those mentioned in the examples are used. Furthermore, while I prefer to use one mole of alkylolamine for each carboxylic acid radical, these proportions may be departed from to some extent, if desired.

The compounds which can be made in accordance with the foregoing description have a number of advantages and uses, all of which need not be named. However, it is to be particularly noted that the products will greatly reduce the surface tension of liquids and this, to some extent, explains the fact that products will penetrate and wet out textile and other fibres. The products may be used in neutral, acid or slightly alkaline solutions. One of the most important advantages is the fact that the products give foamless, or practically foamless, solutions. The penetrating agents heretofore in use are, for the most part, foaming agents, and foaming is extremely objectionable in various textile processes and particularly in the sizing of fibres.

If desired, further products may be made from the alkyl akylolamides of the present invention, as, for example, by sulphonation, and I intend to include within the scope of this invention not only the condensation product of a half ester of a poly-carboxylic acid and an alkylolamine but also the derivatives thereof.

I claim:

1. An alkylol amide of a poly-carboxylic acid alkyl ester.

2. A compound having the general formula

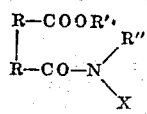

wherein

is the acyl group of a poly-carboxylic acid, R' represents the alkyl group of an alcohol, R'' represents the alkylol group of an amine and X is selected from the group consisting of a hydrogen atom and an alkylol group of the amine.

3. The method of producing a wetting and penetrating agent which comprises first esterifying one carboxylic group of a poly-carboxylic acid with an alcohol having from four to twelve carbon atoms and then amidating another carboxylic group of the acid with an alkylol amine.

4. The method of producing a wetting and penetrating agent which comprises first reacting approximately one mole of an monohydric alcohol with approximately one mole of a dicarboxylic acid anhydride to form a half ester and then reacting the half ester with an alkylol amine to amidate the remaining carboxylic group.

5. The method of producing a wetting and penetrating agent which comprises first reacting approximately one mole of an monohydric alcohol with approximately one mole of a dicarboxylic acid to form a half ester and then reacting the half ester with a poly-alkylol amine to amidate the remaining carboxylic group.

6. The method of producing a wetting and penetrating agent which comprises first reacting approximately one mole of an monohydric alcohol with approximately one mole of a dicarboxylic acid anhydride at temperatures between approximately 100° C. and 120° C. to form a half ester, and then reacting the half ester with approximately one mole of a poly-alkylol amine at temperatures between approximately 140° C. and 170° C. to amidate the remaining carboxylic group.

7. A compound having the general formula

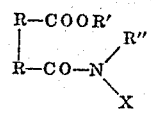

wherein

is the acyl group of a poly-carboxylic acid, R' represents the alkyl group of an alcohol having from four to twelve carbon atoms, R'' represents the alkylol group of an amine and X is selected from the group consisting of a hydyrogen atom and another alkylol group of the amine.

8. A compound having the general formula

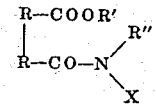

wherein

is the acyl group of a poly-carboxylic acid, R' represents the alkyl group of an alcohol, R'' represents the alkylol group of an amine and X represents another alkylol group of the amine.

SWANEE VICTOR VALJAVEC.